(12) United States Patent
Musselman

(10) Patent No.: US 6,794,603 B1
(45) Date of Patent: Sep. 21, 2004

(54) LASER JOINT WELDING METAL MATERIAL

(75) Inventor: Gary H. Musselman, Lancaster, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/376,593

(22) Filed: Mar. 3, 2003

(51) Int. Cl.$^7$ .............................................. B23K 26/00
(52) U.S. Cl. ............................. 219/121.64; 219/121.85
(58) Field of Search ...................... 219/121.64, 121.63, 219/121.85

(56) References Cited

U.S. PATENT DOCUMENTS

| | | | |
|---|---|---|---|
| 4,682,002 A | * 7/1987 | Delle Piane et al. .... | 219/121.64 |
| 4,684,779 A | 8/1987 | Berlinger et al. | |
| 4,857,697 A | * 8/1989 | Melville ................. | 219/121.63 |
| 4,873,415 A | 10/1989 | Johnson et al. | |
| 5,142,119 A | * 8/1992 | Hillman et al. ........ | 219/121.64 |
| 5,183,992 A | 2/1993 | Bilge et al. | |
| 5,187,346 A | 2/1993 | Bilge et al. | |
| 5,216,220 A | * 6/1993 | Davis et al. ............ | 219/121.63 |
| 5,603,853 A | * 2/1997 | Mombo-Caristan .... | 219/121.64 |
| 5,828,033 A | * 10/1998 | Mitsuyoshi et al. ... | 219/121.64 |

FOREIGN PATENT DOCUMENTS

DE     3909471 A1 * 9/1990 ........... B23K/26/00

* cited by examiner

Primary Examiner—M. Alexandra Elve
(74) Attorney, Agent, or Firm—Liniak, Berenato & White

(57) ABSTRACT

A method of welding at least two metal sheets protected by a zinc coating that has a low vaporizing temperature. The metal sheets are placed on top of each other in such a manner that at least one metal sheet has a curved section beginning at the weld area. The weld is performed partly on the metal sheets in contact and partly at the separation between the metal sheets in order to allow gases generated by vaporization of the protective material to escape from the weld area.

16 Claims, 2 Drawing Sheets

LASER JOINT WELDING METAL MATERIAL

BACKGROUND OF THE INVENTION

1. Field of the Invention

The present invention relates to a method for laser welding multiple sheets of steel together. More particularly, the present invention relates to a method for performing a laser beam welding operation to molecularly bond two pieces of zinc coated steel together.

2. Description of Related Art

Conventionally, laser beam machines are known to be employed, not only for cutting flat or otherwise drawn sheet metal along given cutting lines, but also for spot or seam welding sheets together.

According to general practice, two steel sheets for laser welding are held together contacting each other as tightly as possible along the entire weld area by means of grips, so as to ensure, among other things, maximum thermal conduction between the sheets. The sheets are then subjected to a laser beam, which welds the sheets together by smelting the metal in the weld area swept by the beam.

While the aforementioned method has proved particularly effective for welding bare sheet steel, i.e. having no covering material protecting it against external agents, it proves inadequate when welding together metal sheets protected against external agents by using a layer of coating of low-vaporizing-temperature materials. The term "low-vaporizing-temperature material" is intended to mean material, such as zinc, that has a melting and vaporizing temperature considerably below that of iron.

During laser welding, the energy from the laser beam penetrates through the first piece into the second piece of steel, heating portions of the two pieces to a sufficiently high temperature so that they melt and coalesce together to form a lap joint. However, the zinc material on the abutting surfaces of the first and second pieces violently vaporizes into a gaseous state and tends to separate the upper and lower portions of the weld zone and/or expand through the weld zone toward the laser beam to create porosity in the final weld.

If two thus protected metal sheets using a material such as zinc or a similar material are welded together using the same technique employed for welding bare sheet, the resulting welds invariably prove uneven and riddled with craters, faults which, involve high-cost follow-up machining for their removal.

Methods are known to eliminate these imperfections during the welding process when welding two sheets of metal, the metal being of the type having associated gases tending to be trapped and expand in the weld zone, e.g., vaporized zinc, during welding due to heat from the laser. One method adds to the standard laser beam a surrounding stream of pressurized shield gas effective to create a pressure at the surface of the weld zone sufficient to force the molten metal of the two sheets together and force the expanded associated gases out of the weld zone in a direction away from the laser beam, whereby a non-porous weld may be created.

Another method for welding galvanized material discloses a low vapor pressure mild steel core and a high vapor pressure rich zinc coating including the steps of arranging components of such galvanized material in juxtaposed relationship at a lapped joint and applying a high density laser energy beam along the lapped joint as a weave pattern. The weave pattern has a width great enough to bridge the lapped joint and a weave pattern frequency, which forms a predetermined weld pool between the components. Here, the lapped joint and weave pattern combine to define a vapor pressure relief path so that the weld pool will not be disrupted during the application of the high density laser energy beam to the galvanized components.

It is also known to laser weld steel sheets that have a thin corrosion protective coating of zinc with a method where the steel sheets are positioned vertically. A laser beam, which is positioned normal to the sheets, is then applied to the sheets to melt the material of the sheets and create a weld. During the welding, the sheets and laser beam are moved vertically relative to each other such that laser heating of the material creates a cavity. Thus, liquid or molten material flows vertically downwardly by gravity to elongate the cavity and thereby facilitate the escape of zinc vapors from the cavity.

Similarly, it is known to use a pulsed laser beam when laser welding steel sheets that have a thin corrosion protective coating of zinc to melt the material of the sheets and create a weld. During welding, the laser beam is pulsed ON and OFF and the sheets and pulsed laser beam are moved vertically relative to each other such that laser heating of the material creates a cavity. Here again, liquid or molten material flows vertically downwardly by gravity to elongate the cavity and thereby facilitate the escape of zinc vapors from the cavity.

It is also known to alter the shape of the sheets, the location of the clamp, and the placement of the weld in order to allow external communication between a protective layer and the sheets in the vicinity of the weld area.

Thus, the prior art fails to provide adequate disclosure of the relationship of the sheet shape and the weld location relative to the physical characteristics of the sheets.

In view of the above-mentioned drawbacks, there is a need for a specific geometrical relationship between two zinc-coated sheets of materials, the laser weld location and the geometric shape of the sheets.

SUMMARY OF THE INVENTION

The present invention is directed to a method to perform laser welding for two pieces of metal (preferably, zinc coated steel) together. The method includes providing a first and a second piece of metal in an overlapping relationship. The first piece is curved or otherwise diverges from the second piece at or proximate the location where the laser weld is to be performed. A zone for the laser welding operation is defined between first and second edges and has a predetermined width. The laser weld is then preformed in that zone.

DETAILED DESCRIPTION OF THE PRESENT INVENTION

Figure 1:
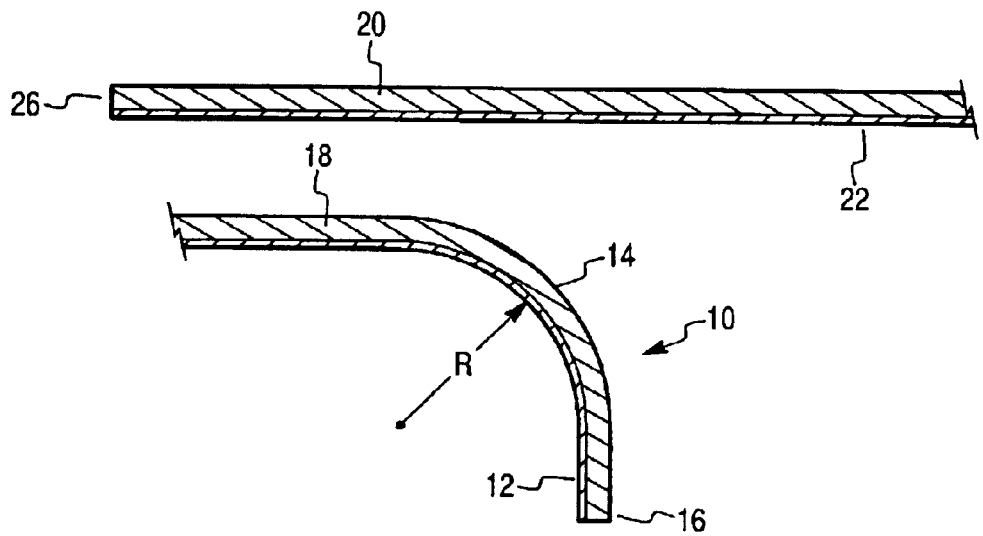
FIG. 1 is a side elevation of the present invention showing the two metal sheets prior to positioning for welding.

As shown in FIG. 1., a first sheet of metal 10 is to be joined with a second sheet of metal 20. The first sheet of metal 10 is arranged on top of the second sheet of metal 20. Both the first sheet of metal 10 and the second sheet of metal 20 include a protective layer 12, 22 made of a low-vaporizing-temperature material. One example of such a material is zinc.

While FIG. 1 indicates that metal sheet 10 and metal sheet 20 are separate sheets, it should be appreciated that for the purposes of this invention, the two metal sheets may also consist of a single sheet bent or wrapped to resemble some form of a U-shape. Furthermore, the attached drawings reflect that a single protective layer 12, 22 is provided on both metal sheets 10, 20. This is by no means limiting the invention; as is usually the case in actual practice, metals sheets 10 and 20 are each provided with two opposed protective layers (not shown). Finally, whereas, in all the attached drawings, a single protective layer 22 of metal sheet 20, is located between sheets 10 and 20 as depicted in FIG. 2, the ensuing description would obviously in no way be affected if the protective layers 12, 22 of both sheets 10 and 20 were located facing each other between the metal sheets.

As seen in FIG. 1, the first metal sheet 10 has a running end 18 that transitions into a curve 14 with a radius R located toward the terminal end 16. The second metal sheet 20 has a terminal end 26 that conforms to the shape of the running end 18 of the first metal sheet 10. This allows a tight fit between the first metal sheet 10 and the second metal sheet 20. The smaller the gap between the two metal sheets, the better formed is the resultant joint weld.

Figure 2:
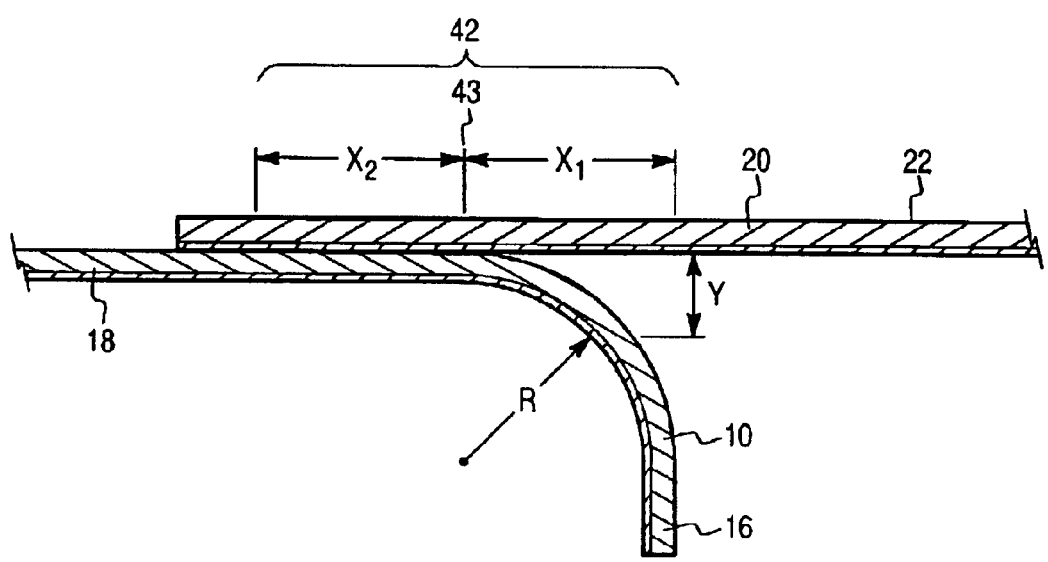
FIG. 2 is side elevation of the present invention showing the two metal sheets positioned for welding.

As best shown in the FIG. 2, the first metal sheet 10 is superimposed onto the second metal sheet so that the running end 18 rests flush on the terminal end 26 of the second metal sheet 20. For welding the two metal sheets 10, 20 on a welding machine, the flat section running end 18 of metal sheet 10 is arranged contacting the terminal end 26 of metal sheet 20 and held to the latter by means known to one skilled in the art Subsequently, the head on the welding machine (not shown) is arranged facing the free surface of the first metal sheet 10 in the weld area 42 along a centerline 50 (see FIG. 3).

The weld area 42 is defined as a function of the radius of curvature of the first metal sheet 10, maximum allowable weld gap and the minimum material thickness. The weld area 42 is defined from a point of tangency between the two metal sheets 10 and 20. The weld area 42 has a first maximum distance from the point of tangency toward the radius of curvature and the gap between the two metal sheets 10 and 20 as well as a second maximum distance from the point of tangency toward the two metal sheets 10 and 20 in the direction where they are in contact. The distances are graphically shown as $X_1$ and $X_2$.

It is necessary to define a maximum gap y between the curved section 14 of the first metal sheet 10 and the second metal sheet 20 at the first maximum distance $X_1$. The maximum gap y is important because it affects the top profile of the weld when completed. If the gap y is too wide, then the weld will sag and create a condition where the weld may fail under even a minimal load. A very small will reduce the weld area 42 to a width not practical to achieve repeatable weld placement with conventional methods. If the gap y is reduced to a point where the zinc vapor cannot escape during welding, the result will be in porosity and voids in the weld, contributing to a potential failure of the weld under a minimal load.

Figure 3:
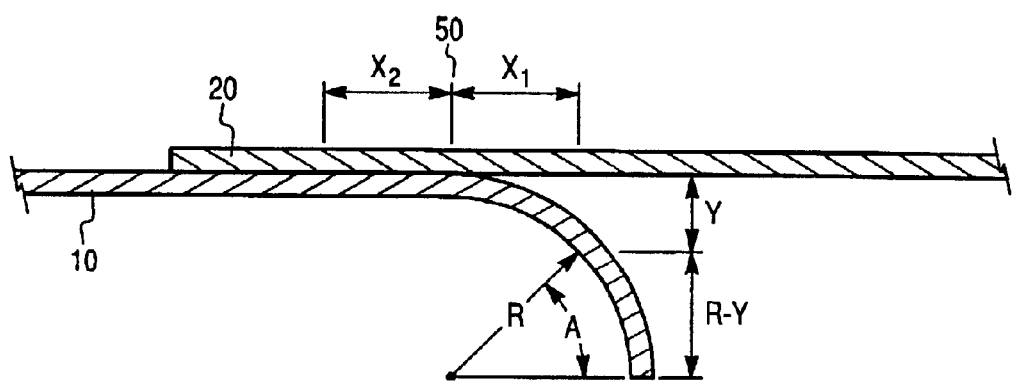
FIG. 3 is a side elevation indicating the geometrical relationships used in the present application.

The specific measurement location used to determine the weld area 42 and their geometrical relationship to the first and second metal sheets are best seen in FIG. 3.

The second maximum distance from the point of tangency $X_2$ maybe defined in relation to the material thickness of the sheets 10 and 20, for example, as half the minimum material thickness of the two metal sheets 10 and 20.

The first maximum distance from the point of tangency $X_1$ is defined as a function of the radius R and the gap y at the first maximum distance $X_1$ and determined by executing the following formulas.

First, the gap y between the first metal sheet 10 and the second metal sheet 20 at the first maximum distance $X_1$ is determined. The gap y is determined by the following formula:

$$y=0.2(R)$$

where R equals the radius of curvature.

The distance R−y is determined after calculating the gap y. The distance R−y is necessary to determine the angle A, through the following formula:

$$\text{Sine } A=(R-y)R$$

Once angle A has been determined, then the first maximum distance $X_1$ is found by the following mathematical equation:

$$X_1=R(\cos A)$$

The resultant first maximum distance $X_1$ coincides with the maximum gap y measurement along the circumference of the curved section.

The weld area 42 has a centerline 50 from which the laser head is aligned. The centerline 50 between $X_1$ and $X_2$ is can be roughly estimated once the critical values of the material thickness and the radius of curvature is known. The weld area 42 placement can be roughly determined through use of the following table:

TABLE 1

| Radius | Weld Placement Range Thickness (mm) | | | | | | |
|---|---|---|---|---|---|---|---|
| (mm) | 0.8 | 1.0 | 1.2 | 1.4 | 1.6 | 1.8 | 2.0 |
| 8 | .8 | .9 | 1.0 | 1.1 | 1.1 | 1.2 | 1.3 |
| 10 | .9 | 1.0 | 1.1 | 1.2 | 1.3 | 1.3 | 1.4 |
| 12 | 1.0 | 1.1 | 1.2 | 1.3 | 1.4 | 1.5 | 1.5 |
| 14 | 1.1 | 1.2 | 1.3 | 1.4 | 1.5 | 1.6 | 1.7 |

Thus, the distance of the first and second maximum distances $X_1$ and $X_2$ is the range wherein the weld can be placed. Other factors to be considered when applying this technique include the laser power being used to weld the materials. The variation of laser power would impact the maximum thickness of the materials to be welded together.

Figure 4:
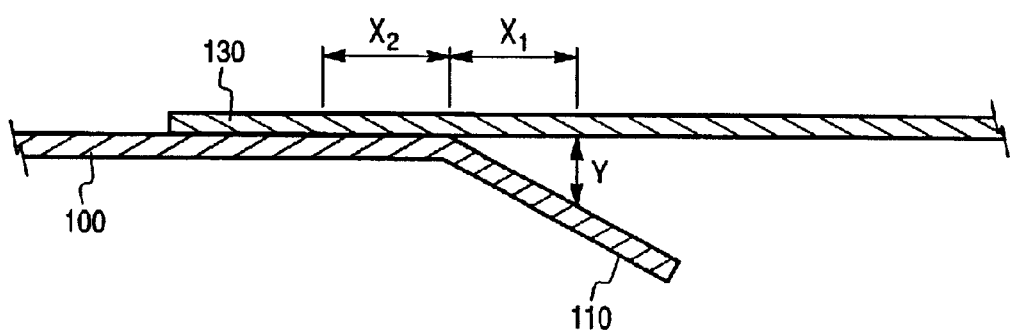
FIG. 4 is a side elevation of an alternate embodiment of the present invention using a slope rather than a curved section.

FIG. 4 illustrates another embodiment of the present invention. Here the first metal sheet 100 has an angled section 110 that angles away from the second metal sheet 130, rather than a curved section as in the previous example. Here, the angled section 110 has a slope that is used to determine the maximum gap allowed. The slope is used to compute the geometrical relationships of the first maximum distance $X_1$ and the maximum gap y allowed.

From the foregoing description, one skilled in the art can easily ascertain the essential characteristics of this invention, and without departing form the spirit and scope thereof, can make various changes and modifications of the invention to adapt it to various usages and conditions. For example, the coating may be of another material other than zinc.

I claim:
1. A method for performing a laser beam welding operation to molecularly bond two pieces of metal together including the steps of:
providing at least a first metal material and a second metal material in an overlapping relationship, wherein said first metal material has a section that diverges from said second metal material defining a gap area there between;
defining a zone for performing a laser welding operation, wherein said zone extends between a first and a second edge and has a predetermined width terminating at a location corresponding to a maximum gap between said first and said metal material; and
performing a laser weld within said zone;
wherein said maximum gap between said first and said metal material is determined by the following equation:

$$y=0.2(R)$$

where y is the maximum
R is a minimum thickness of one of said first and said second metal material.
2. The method according to claim 1, wherein at least one of said metal materials includes a zinc based protective.
3. A method for performing a laser beam welding operation to molecularly bond two pieces of metal together including the steps of:
providing at least a first metal material and a second metal material in an overlapping relationship, wherein said first metal material has a section that diverges from said second metal material along a curved portion having a radius of curvature;
defining a zone for performing a laser welding operation, wherein said zone extends between a first and a second edge and has a predetermined width; and
performing a laser weld within said zone;
wherein the step of defining a zone is determined as a function of said radius of curvature of said first metal material.
4. A method for performing a laser beam welding operation to molecularly bond two pieces of metal together including the steps of:
providing at least a first metal material and a second metal material in an overlapping relationship, wherein said first metal material has a section that diverges from said second metal material;
defining a zone for performing a laser welding operation, wherein said zone extends between a first and a second edge and has a predetermined width; and
performing a laser weld within said zone;
wherein the step of defining said zone is a function of a geometric characteristic selected from one of a radius of curvature of said first metal material, and a minimum material thickness.
5. A method for performing a laser beam welding operation to molecularly bond two pieces of metal together including the steps of:
providing at least a first metal material and a second metal material in an overlapping relationship, wherein said first metal material has a section that diverges from said second metal material over a gap area;
defining a zone for performing a laser welding operation, wherein said zone extends between a first and a second edge and has a predetermined width; and
performing a laser weld within said zone; wherein said zone includes a zero gap area located from a tangent point to a position on said first and said second metal materials that are in contact with each other, and said tap area;
wherein said zero gap area is defined by the following equation:

$$X_2=S/2$$

where $X_2$ is the zero gap area; and
S is a minimum thickness of one of said first and said second metal sheets.
6. A method for performing a laser beam welding operation to molecularly bond two pieces of metal together including the steps of:
providing at least a first metal material and a second metal material in an overlapping relationship, wherein said first metal material has a section that diverges from said second metal material over a gap area;
defining a zone for performing a laser welding operation, wherein said zone extends between a first and a second edge and has a predetermined width; and
performing a laser weld within said zone; wherein said zone includes a zero gap area located from a tangent point to a position on said first and said second metal materials that are in contact with each other, and said gap area;
wherein said gap area is determined from the following formula:

$$X_1=R(\cos A)$$

where $X_1$ is the gap area;
R is a radius of curvature of said curved section; and
A is an angle formed from said radius and $X_1$, where A is determined from the following equation:

$$\sin A=(R-y)R,$$

where y is a maximum gap.
7. A method for performing a laser beam welding operation to molecularly bond two pieces of metal together including the steps of:
providing at least a first metal material and a second metal material in an overlapping relationship, wherein said first metal material has a section that diverges from said second metal material over a gap area;
defining a zone for performing a laser welding operation, wherein said zone extends between a first and a second edge and has a predetermined width; and
performing a laser weld within said zone; wherein said zone includes a zero gap area located from a tangent point to a position on said first and said second metal materials that are in contact with each other, and said gap area;
wherein said first edge is located at a boundary of said zero gap area and said second edge is located at a boundary of said gap area.
8. The method according to claim 7, wherein said first edge is proximate a position where said first and second metal materials are in contact.

9. The method according to claim 7, wherein said gap area has a maximum gap determined by the following equation:

$$y=0.2(R)$$

where y is the maximum gap

R is a minimum thickness of one of said first and said second metal sheets.

10. The method according to claim 3, wherein at least one of said metal materials includes a zinc based protective layer.

11. The method according to claim 4, wherein at least one of said metal materials includes a zinc based protective layer.

12. The method according to claim 5, wherein at least one of said metal materials includes a zinc based protective layer.

13. The method according to claim 6, wherein at least one of said metal materials includes a zinc based protective layer.

14. The method according to claim 7, wherein at least one of said metal materials includes a zinc based protective layer.

15. A method for performing a laser beam welding operation to molecularly bond two pieces of metal together including the steps of:

providing at least a first metal material and a second metal material in an overlapping relationship over a zero gap area, said first metal material further having a gap area wherein a section of said first metal material diverges from said second metal material defining a spaced gap between said first and second metal material;

defining a zone for performing a laser welding operation, wherein said zone extends over both a portion of said zero gap area and said gap area and terminating in said gap area at a location corresponding to a maximum gap between said first and said metal material, and said maximum at being derived in relation to a geometry of said first metal material in said gap area diverging from said second metal material; and performing a laser weld within said zone without extending beyond said location corresponding to said maximum gap between said first and second metal materials; said maximum gap.

16. The method according to claim 7, wherein said step of providing said first and second metal material includes proving at least one of said metal materials made of steel having a zinc based protective layer.

* * * * *